United States Patent
Gstach et al.

(10) Patent No.: US 7,740,435 B2
(45) Date of Patent: Jun. 22, 2010

(54) THREAD-TAPPING SCREW

(75) Inventors: Peter Gstach, Schaan (LI); Berthold Aumueller, Grafenwöhr (DE)

(73) Assignee: Hilti Aktiengesellscahft, Schaan (LI)

( * ) Notice: Subject to any disclaimer, the term of this patent is extended or adjusted under 35 U.S.C. 154(b) by 63 days.

(21) Appl. No.: 12/290,622

(22) Filed: Oct. 30, 2008

(65) Prior Publication Data
US 2009/0155018 A1    Jun. 18, 2009

(30) Foreign Application Priority Data
Oct. 31, 2007   (DE) .................. 10 2007 000 607

(51) Int. Cl.
*F16B 25/00*   (2006.01)
(52) U.S. Cl. .................... 411/386; 411/387.5
(58) Field of Classification Search ............... 411/386, 411/387.1, 387.2, 387.3, 387.4, 387.5, 387.6, 411/387.7, 387.8, 311, 411; 408/218; 470/10
See application file for complete search history.

(56) References Cited

U.S. PATENT DOCUMENTS

| | | | | |
|---|---|---|---|---|
| 3,426,642 A | * | 2/1969 | Phipard, Jr. | 411/417 |
| 3,831,415 A | * | 8/1974 | Skierski | 72/88 |
| 3,982,464 A | * | 9/1976 | Sygnator | 411/418 |
| 4,259,889 A | * | 4/1981 | Capuano | 411/417 |
| 5,385,439 A | * | 1/1995 | Hurdle | 411/386 |
| 6,478,520 B1 | * | 11/2002 | Sala | 411/386 |
| 7,338,243 B2 | * | 3/2008 | Gerhard | 411/387.4 |
| 2006/0120826 A1 | * | 6/2006 | Wieser et al. | 411/387.4 |
| 2006/0193713 A1 | * | 8/2006 | Gerhard | 411/387.4 |

* cited by examiner

*Primary Examiner*—Gary Estremsky
(74) *Attorney, Agent, or Firm*—Abelman, Frayne & Schwab

(57) ABSTRACT

A thread-tapping screw (11) has a thread (21) extending, starting from the screw shaft free end (15), at least along a portion of the shaft length and a height of which constantly decreasing toward the free end (15) of the shaft (12), and a plurality of cutting bodies (26, 36, 46, 56, 66) formed of a material having a greater hardness than hardness of the thread (21), located in recesses (24) formed in the thread (21) and opening radially outwardly and having, respectively, a radial outer profile (27, 37, 47, 57, 67) projecting, at least partially, beyond the thread and a height (A, B, C, D, E) of which decreases toward the free end (15) of the shaft (12) stepwise.

4 Claims, 1 Drawing Sheet

THREAD-TAPPING SCREW

BACKGROUND OF THE INVENTION

1. Field of the Invention

The present invention relates to thread-tapping screw having a shaft having a free end region, a thread extending starting from the screw shaft free end, at least along a portion of the shaft length, and a plurality of cutting bodies formed of a material having a greater hardness than hardness of the thread, located in recesses formed in the thread and opening radially outwardly and having, respectively, a radial outer profile projecting, at least partially, beyond the thread.

2. Description of the Prior Art

Screws which are described above, are screwed directly in a borehole that was preliminary formed in a constructional component, with the thread of the screw forming or tapping a counter-thread or an undercut in the constructional component.

For outside applications, the screw, such as concrete screws, advantageously, are formed of a corrosion-resistant steel. However, steel materials often have a hardness that is not sufficient for tapping a counter-thread in a mineral constructional component, and the thread of the screw wears off during the screw being screwed in. Toughening of the screw or, e.g., of the thread, which is formed integrally with the shaft, is possible only to a limited extent when a corrosion-resistant material is used for forming the screw.

German Publication DE 198 52 338 A1 discloses a screw which is formed of a stainless steel and the shaft and thread of which are provided with a plurality of receiving bores which open radially outwardly and in which cutting bodies in form of cylindrical cutting pin inserts of a hardened steel are received. The cutting pin inserts facilitate cutting-in in hard mineral constructional components such as, e.g. concrete or brickwork. The cutting pin inserts are retained in the receiving recesses in the shaft formlockingly in the screw-in direction and frictionally in the radial direction.

The drawback of the self-tapping screw of DE 198 52 338 A1 consists in that all of the cutting pin inserts project beyond the cross-sectional projection surface of the thread by the same amount. Because the first cutting pin insert, adjacent to the thread pilot, already produces the entire undercut volume for the screw thread, high forces act on this cutting pin insert, this cutting pin insert has a tendency to break off the thread. Further, a high input torque is required for setting such thread-tapping screws, in particular, when the screws have a small diameter.

Accordingly, an object of the present invention is to provide a thread-tapping screw that facilitates setting of the screw in hard constructional component such as, e.g., concrete.

Another object of the present invention is to provide a thread-tapping screw for hard constructional components that can easily be manufactured.

SUMMARY OF THE INVENTION

These and other objects of the present invention, which will become apparent hereinafter, are achieved by providing a screw of the type discussed above and in which a height of the thread constantly decreasing toward the free end of the shaft, and a height of the outer radial profile of the cutting bodies decreases toward the free end of the shaft stepwise.

With the thread height decreasing toward the shaft free end, the radial outer profile of the cutting body adjacent to the thread pilot has, with respect to the radial outer surface of the shaft, the smallest height in comparison with the other cutting bodies provided in the thread. With a stepped arrangement of radial outer profile of the cutting bodies toward the free end of the shaft, the radial outer profile of cutting bodies has a height, with respect to the shaft radial outer surface, that decreases constantly in respective sections of the thread. As a result, the entire necessary undercut volume for the thread of the thread-tapping screw is not produced any more by the first, adjacent to the thread pilot, cutting body. Rather, the counter-thread or undercut, which is produced by the first cutting body, is deepened successively by the following, in the direction of the thread course, cutting bodies to a necessary undercut volume for the screw thread. With this, smaller forces act on separate cutting bodies. The first cutting body is located near the thread pilot, as is the case in conventional screws with cutting bodies arranged in the thread. This is because due to noticeably smaller forces acting on the cutting bodies, in particular on the first cutting body, the rear support surface of the section of the thread which adjoins the thread pilot and the height of which constantly increases proceeding from the thread pilot, is sufficient for an adequate support and anchoring of the cutting bodies in this section. At the start of the screw-in process, a few or not at all of the cutting bodies break or fall off. Thus, essentially all of the cutting bodies embedded in the thread are available for the entire thread tapping process.

In addition, the stepped arrangement of the cutting bodies, with which the section of the thread has a height that constantly decreases toward the free end of the shaft, insures a uniform tapping at the start of the screw-in process. As the cutting process is distributed between a plurality of arranged one after another cutting bodies, smaller peak pressures occur on the cutting bodies which at least partially project beyond the cross-sectional projection surface of the thread. This insures an advantageous profile of the undercut or counter-thread in a constructional component. The peak pressures on the cutting bodies, which locally can exceed the crushing strength of a mineral constructional component, lead to localized limited destruction of the constructional component which, in turn, leads to an excessive removal of the material of the constructional component, so that the thread, engageable in the produced undercut in this region, can transmit a limited load or no load at all. The inventive, thread-tapping screw has, in comparison with known screws, a smaller screw-in torque, a smaller setting time, and a high probability of being set even at smaller bore dimensions.

Mineral constructional component, such as concrete, has a reinforcement iron that can lie, as the case may be, in the region of the borehole. The stepped arrangement of the hard cutting bodies insures displacement of the screw even upon encounter with a reinforcement iron.

The cutting bodies, as discussed above, are formed of a hard material and, advantageously, are secured in the thread by resistance welding.

Advantageously, the height of the radial outer profile of the cutting bodies uniformly decreases from cutting bodies to cutting bodies, so that each cutting body must cut, in a constructional component, substantially the same undercut volume. This insures the uniformity of the force acting on the cutting bodies because the cutting job essentially uniformly distributed between all of the cutting bodies.

Advantageously, the cutting body has a polygonal cross-section, and at least one of the polygonal edges of the cutting body forms the radial outer profile of the cutting body. The so-formed cutting bodies have a particularly advantageous behavior in the constructional component. Advantageously, the cutting body has a shape close to the thread, wherein "close to the thread" means projecting at least partially beyond the cross-sectional projection surface of the thread. Advantageously, all of the cutting bodies have the same cross-sectional shape. That enables an easy manufacturing of the inventive screw. In an alternative embodiment, cutting bodies, which have different cross-sections, are provided on the thread.

The cutting bodies, which have different cross-sections, are arranged in accordance with a desired cutting behavior of the thread. The cutting bodies have, e.g., a circular or polygonal cross-section.

Advantageously, a section of the thread the height of which constantly decreases toward the free end of the shaft, has from two to ten, preferably, three to six cutting bodies. This ensures an advantageous cutting-in and cutting behavior of the thread.

Advantageously, in an axial projection of the shaft, the cutting bodies are offset relative to each other, respectively, by from 60° to 120°, which ensures advantageous cutting-in and cutting behavior. The angle between the cutting bodies varies, dependent on the screw diameter.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

In the drawings the same elements are designated with the same reference numerals.

DETAILED DESCRIPTION OF THE PREFERRED EMBODIMENT

Figure 1:
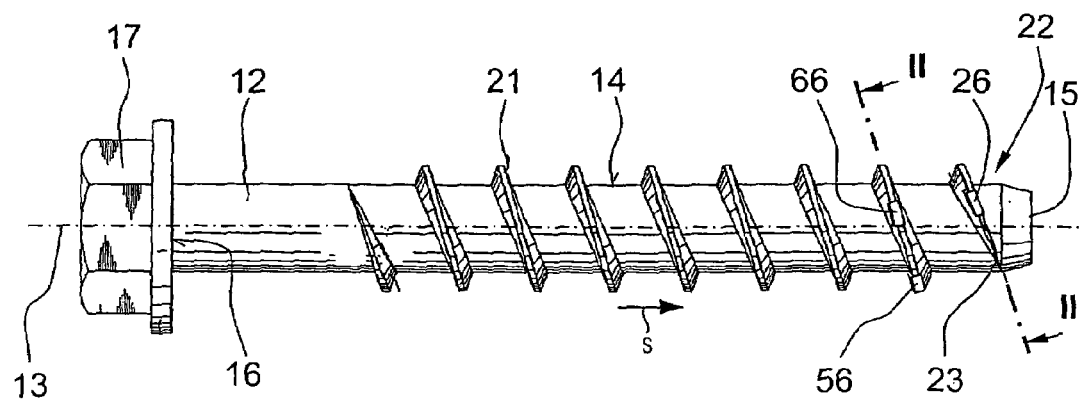
FIG. 1 a side view of a screw according to the present invention.
Figure 2:
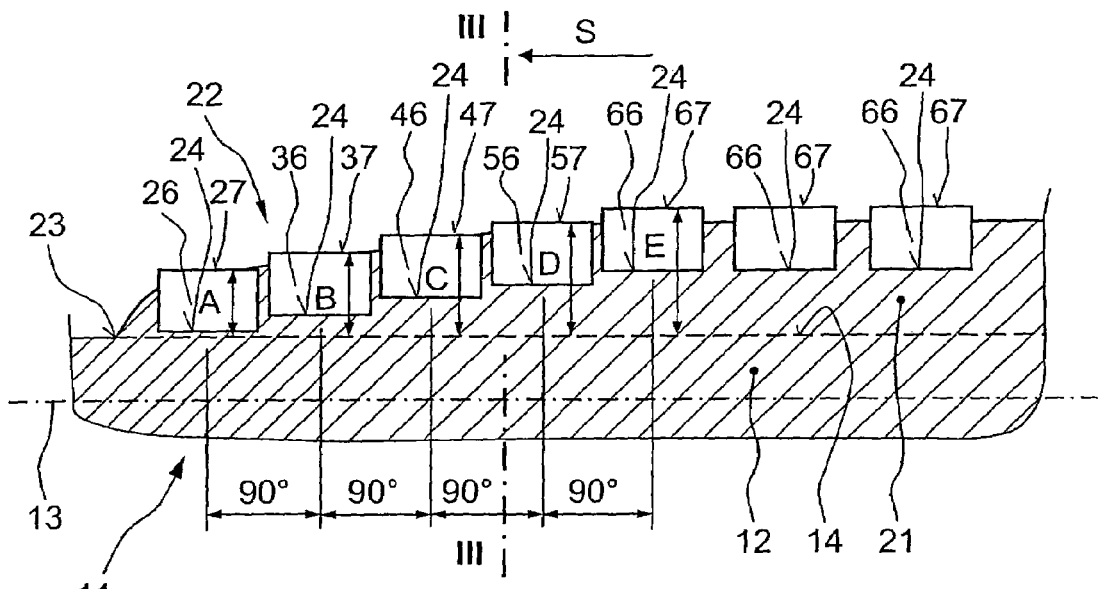
FIG. 2 a cross-sectional view through the thread and a cutting body along line II-II in FIG. 1 at an increased scale.
Figure 3:
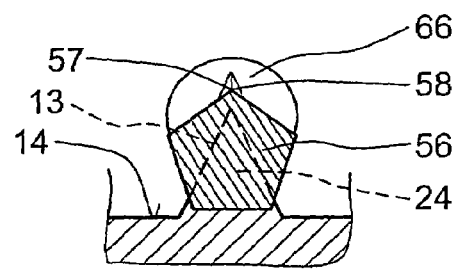
FIG. 3 a cross-sectional view through the cutting body along line III-III in FIG. 2.

A screw 11 according to the present invention, which is shown in FIGS. 1 and 2, has a shaft 12 and a thread 21 formed integrally with the shaft 12 and extending, starting from the shaft free end 15, at least along a portion of the shaft length. The shaft 12 extends along a longitudinal axis 13 of the screw 11 and has a radially outer surface 14. At the end 16 of the shaft 12 opposite the free end 15, there is provided a hexagonal screw head that forms rotation-transmitting means 17. In the drawings the arrow S indicates the screw-in direction of the screw 11.

The thread 21 has a plurality of recesses 24 which opens radially outwardly and in which cutting bodies 26, 36, 46, 56, 66 are located. The cutting bodies 26, 36, 46, 56, 66 are formed of a material having a greater hardness then the hardness of the thread 21. A radial outer profile 27, 37, 47, 56, 67 of the cutting bodies 26, 36, 46, 56, 66 at least partially projects beyond the profile of the thread 21. The height of the thread 21 with respect to the shaft outer surface 14 constantly decreases toward the shaft free end 15. The height A, B, C, D, E of the radial outer profile 27, 37, 47, 57, 67 of the respective cutting bodies 26, 36, 46, 56, 66 uniformly and stepwise decreases with respect to the shaft outer surface 14.

The cutting bodies 56 have, in cross-section, a shape of a pentagon. A polygonal edge 58 of the cutting bodies 56 forms the outer radial profile 57 of the cutting bodies 56. The cutting bodies 66 which follow, proceeding from the thread pilot 23 of the thread 21, the cutting bodies 56, have each a circular cross-section.

Though the present invention was shown and described with references to the preferred embodiment, such is merely illustrative of the present invention and is not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A thread-tapping screw (11), comprising a shaft (12) having a free end (15); a thread (21) extending, starting from the shaft free end (15), at least along a portion of the shaft length, a height of the thread constantly decreasing toward the free end (15) of the shaft (12); and a plurality of cutting bodies (26, 36, 46, 56, 66) formed of a material having a greater hardness than hardness of the thread (21), located in recesses (24) formed in the thread (21) and opening radially outwardly and having, respectively, a radial outer profile (27, 37, 47, 57, 67) projecting, at least partially, beyond the thread and a height (A, B, C, D, B) of which with respect to a shaft outer surface decreases toward the free end (15) of the shaft (12) stepwise.

2. A thread-tapping screw according to claim 1, wherein the height of the radial outer profile (27, 37, 47, 57, 67) of the cutting bodies (26, 36, 46, 56, 66) uniformly decreases from cutting bodies (26, 36, 46, 56, 66) to cutting bodies (26, 36, 46, 56, 66).

3. A thread-tapping screw according to claim 1, wherein a section of the thread (21) the height of which constantly decreases toward the free end (15) of the shaft (12), has from two to ten cuffing bodies (26, 36, 46, 56, 66).

4. A thread-taping screw according to claim 1, wherein in an axial projection of the shaft (12), the cuffing bodies are offset relative to each other, respectively, by from 60° to 120°.

* * * * *

UNITED STATES PATENT AND TRADEMARK OFFICE
CERTIFICATE OF CORRECTION

PATENT NO. : 7,740,435 B2
APPLICATION NO. : 12/290622
DATED : June 22, 2010
INVENTOR(S) : Peter Gstach et al.

It is certified that error appears in the above-identified patent and that said Letters Patent is hereby corrected as shown below:

Title Page, Item (73) should read
-- {73}   Assignee: Hilti Aktiengesellschaft, Schaan (LI) --.

Signed and Sealed this

Ninth Day of November, 2010

David J. Kappos
*Director of the United States Patent and Trademark Office*